No. 775,205.

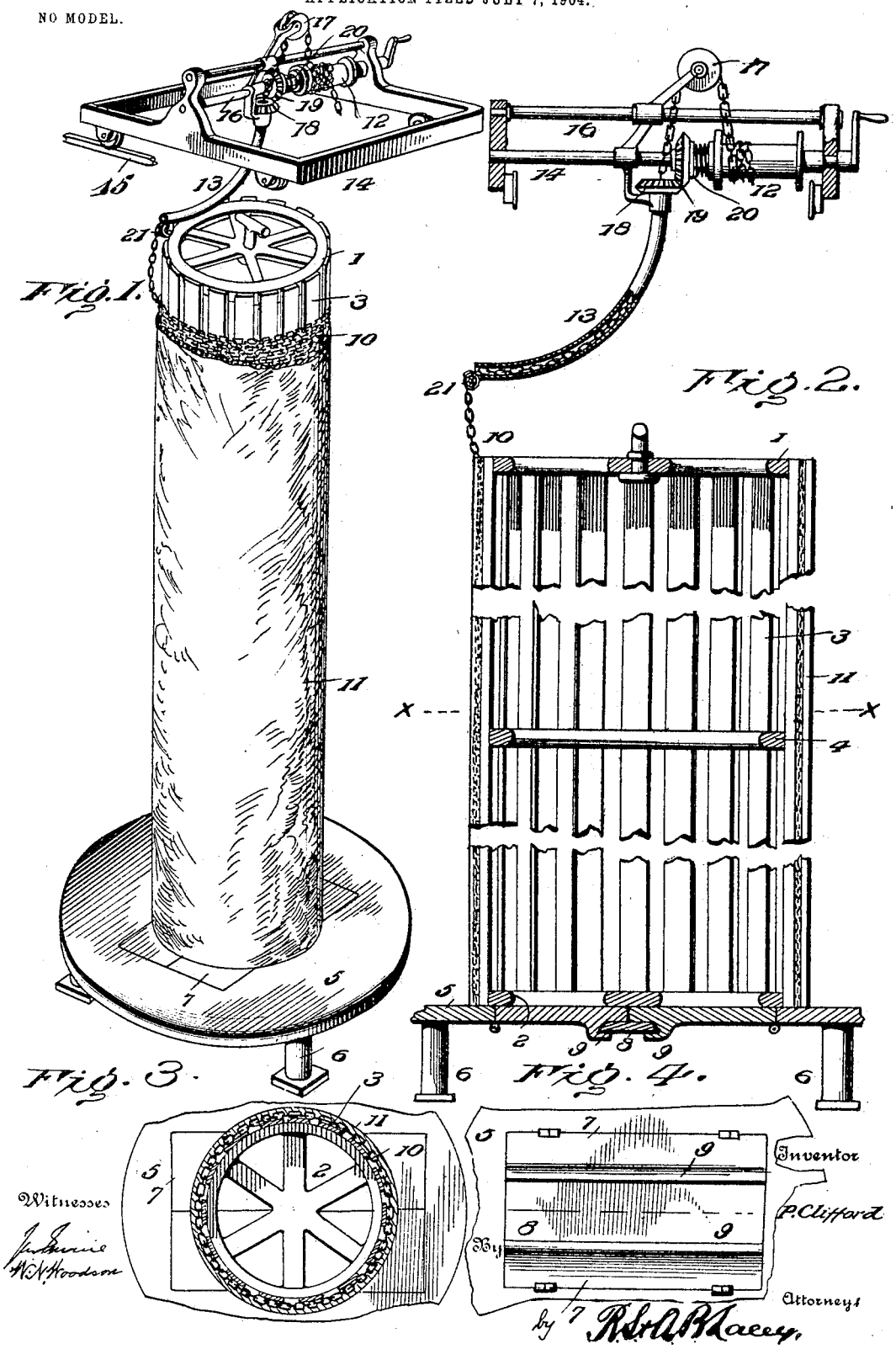

Patented November 15, 1904.

UNITED STATES PATENT OFFICE.

PATRICK CLIFFORD, OF RICHMOND, VIRGINIA.

CORE FOR PIPE-MOLDS.

SPECIFICATION forming part of Letters Patent No. 775,205, dated November 15, 1904.

Application filed July 7, 1904. Serial No. 215,617. (No model.)

*To all whom it may concern:*

Be it known that I, PATRICK CLIFFORD, a citizen of the United States, residing at Richmond, in the county of Henrico and State of Virginia, have invented certain new and useful Improvements in Cores for Pipe-Molds, of which the following is a specification.

This invention appertains to a novel formation of core designed most especially for use in the casting of metal pipes of large bore, but which may be used for foundry-work, generally in the manufacture of hollow castings, such as columns. The best results are obtained by the use of a core comprising a drum or barrel around which is wound rope formed of hay or straw, the whole being coated with mud or clay. The hay or straw rope is destroyed at each casting and is a considerable item of expense. Hence the cost of manufacture is comparatively great.

This invention has for its object to materially reduce the cost of manufacture and to prevent the loss incident to the destruction of the hay or straw rope. This is effected by substituting a chain or like indestructible flexible covering which may be wrapped about the barrel or drum.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a core and adjunctive parts embodying the invention. Fig. 2 is a vertical central section thereof. Fig. 3 is a horizontal section on the line *x x* of Fig. 2, parts of the platform being broken away. Fig. 4 is a view of the center portion of the platform inverted.

Corresponding and like parts are referred to in the following description and indicated in all the views of the drawings by the same reference characters.

The drum or barrel comprising the body of the core consists of ends or heads 1 and 2 and a series of spaced slats 3, secured at their ends to the parts 1 and 2 in any substantial manner. In the event of the drum or barrel being of considerable length the slats 3 may be braced between their ends by a support 4, which may be of annular formation or other desired construction. The slats may be supported at one or more points, as may be found necessary. The spaces between the slats provide clearance for the mud or clay detached from the covering when unwinding same from the barrel or drum.

A platform 5 receives the core or mold, the latter not being shown, and is provided with feet 6 to hold it elevated the required distance. Trap-doors 7 close an opening in the center part of the platform and are adapted to swing downward and are held closed by suitable means, such as a key 8, which is forced into ways 9, formed upon the lower side of the trap-doors near their meeting edges. The ways 9 are undercut, so as to retain the key 8 in position, and the latter is slightly tapered to hold the doors firmly in place. The trap-doors provide an escape for mud and clay dropped into the center portion of the drum or barrel.

The covering for the drum or barrel consists, preferably, of a chain 10, the same being wound around the drum in such a manner as to receive the mud or clay 11, forming the dressing in the finishing of the core. While a chain 10 is the preferred form of covering, nevertheless a wire cable or other flexible non-destructible material may be utilized. The chain or flexible non-combustible covering after being wrapped around the barrel or drum is coated with mud or clay in the usual manner and the core placed in position and the casting effected in the ordinary way. After the casting has been cooled the core is removed by unwinding the chain or covering 10 from the barrel or drum. During this operation the mud or clay forming the dressing is broken away and falls through the spaces between the slats 3 into the interior of the core and collects upon the trap-doors 7, from which it is removed by withdrawing the key 8 and permitting said trap-doors to swing downward.

The unwinding of the chain or flexible noncombustible covering is effected by the means substantially as shown, the same consisting of a windlass 12, which may be operated either by hand or other power, a guide 13, gearing between the shaft of the windlass and said guide, and mountings for the operating parts, consisting of a carriage 14, arranged to travel upon a track 15. A shaft 16 is journaled in end or side pieces of the carriage 14, and the windlass 12 is mounted thereon so as to rotate therewith and take up the chain or like part 10 as the same is unwound from the drum or barrel. The guide 13 consists of a curved tube of elbow form arranged to rotate about a vertical axis about in line with the axis of the core. The chain 10 or like flexible covering is adapted to pass through the guide 13 and over a guide-pulley 17, arranged above the shaft 16 with one side about in vertical alinement with the vertical member of said guide. A bevel-gear 18 is secured to the upper end of the guide 13 and meshes with a companion bevel-gear 19, loose upon the shaft 16. A friction-clutch 20 of ordinary construction is interposed between the loose bevel-gear 19 and the windlass 12 to cause the guide 13 to rotate and to take up the chain 10 as the same is unwound from the drum or barrel. A guide-pulley 21 is provided at the outer end of the guide 13 to minimize the friction of the chain 10 therewith.

An end portion of the chain 10 is passed through the guide 13 over the guide-pulley 17 and is made fast to the windlass 12. After the casting has sufficiently cooled and it is desired to remove the core the windlass 12 is rotated to wind up the chain 10 and correspondingly unwind said chain from the drum or barrel. After the chain has been wholly unwound from the drum or body of the core the carriage 14 is moved out of the way and the hoisting mechanism (not shown) attached to the core in the usual way to effect removal thereof from the pipe or casting. The chain being flexible and non-combustible may be used repeatedly, thereby saving the cost incident to the destruction of the hay or straw rope usually employed as covering for the core of pipe-molds and hollow castings of similar construction.

Having thus described the invention, what is claimed as new is—

A core for pipe-molds and hollow castings of kindred nature, the same comprising a drum or barrel having its body composed of spaced elements, and a chain wrapped about the body of the core and forming a base to receive the mud or clay forming the dressing.

In testimony whereof I affix my signature in presence of two witnesses.

PATRICK CLIFFORD. [L. S.]

Witnesses:
 IVAN HEIDEMAN,
 V. B. HILLYARD.